(12) United States Patent
Seto et al.

(10) Patent No.: US 7,447,826 B2
(45) Date of Patent: Nov. 4, 2008

(54) RECEIVE BUFFER IN A DATA STORAGE SYSTEM

(75) Inventors: Pak-Lung Seto, Shrewsbury, MA (US); Richard C. Beckett, Phoenix, AZ (US); Devicharan Devidas, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 514 days.

(21) Appl. No.: 10/815,909

(22) Filed: Mar. 31, 2004

(65) Prior Publication Data

US 2005/0223140 A1 Oct. 6, 2005

(51) Int. Cl.
G06F 13/36 (2006.01)
G06F 13/00 (2006.01)

(52) U.S. Cl. ............................ 710/310; 710/29; 710/52

(58) Field of Classification Search ............. 710/52–57, 710/29–38, 71, 306–313; 370/229–236, 370/464–468

See application file for complete search history.

(56) References Cited

U.S. PATENT DOCUMENTS

| | | | | |
|---|---|---|---|---|
| 5,473,604 | A * | 12/1995 | Lorenz et al. | 370/229 |
| 5,691,985 | A * | 11/1997 | Lorenz et al. | 370/401 |
| 5,732,286 | A * | 3/1998 | Leger | 710/57 |
| 5,995,486 | A * | 11/1999 | Iliadis | 370/229 |
| 6,249,756 | B1 | 6/2001 | Bunton et al. | |
| 6,252,851 | B1 | 6/2001 | Siu et al. | |
| 6,490,271 | B1 * | 12/2002 | Erjanne | 370/347 |
| 6,687,254 | B1 | 2/2004 | Ho et al. | |
| 2002/0159480 | A1 * | 10/2002 | Sekihata et al. | 370/468 |
| 2003/0074515 | A1 * | 4/2003 | Resnick | 710/313 |
| 2004/0100977 | A1 * | 5/2004 | Suzuki et al. | 370/401 |
| 2004/0202155 | A1 | 10/2004 | Natarajan et al. | |
| 2004/0252716 | A1 * | 12/2004 | Nemazie | 370/447 |
| 2005/0094668 | A1 | 5/2005 | Hanif et al. | |
| 2005/0223140 | A1 * | 10/2005 | Seto et al. | 710/52 |
| 2005/0223141 | A1 * | 10/2005 | Seto et al. | 710/57 |
| 2005/0233140 | A1 | 10/2005 | Oh et al. | |
| 2006/0095608 | A1 | 5/2006 | Seto | |

OTHER PUBLICATIONS

"PCI Express Base Specification Revision 1.0", *PCI Express, Table of Contents*, (Jul. 24, 2002), 15 pgs.
"PCI-X Addendum to the PCI Local Bus Specification", *Revision 1.0a, Table of Contents*, (Jul. 24, 2000), 9 pgs.
"Serial ATA: High speed Serialized AT Attachment, Serial ATA Workgroup", *Revision 1.0a, Table of Contents*, APT Technologies, Inc., (Jan. 7, 2003), 10 pgs
"American National Standard", Working Draft Serial Attached SCSI - 1.1 (SAS-1.1), Revision 6 (Oct. 2, 2004), 534 pgs.
"INCITS working draft proposed Americna National Standard for Information Technology", Fibre Channel-Framing and Signaling-2 (FC-FS-2) Rev 0.30 (Sep. 7, 2004), 442 pgs.

(Continued)

*Primary Examiner*—Christopher B. Shin
(74) *Attorney, Agent, or Firm*—Grossman, Tucker, Perreault & Pfleger, PLLC

(57) ABSTRACT

A method according to one embodiment may include receiving data in a receive buffer, the receive buffer comprising a plurality of buffers, and sending a hold command to a transmitting node currently sending data to hold transmission of additional data when a level of the data in the receive buffer reaches a high threshold level. Of course, many alternatives, variations, and modifications are possible without departing from this embodiment.

12 Claims, 3 Drawing Sheets

OTHER PUBLICATIONS

"Working Draft American National Standard, Project T10/1601-D", Information Technology-Serial Attached SCSI-1.1 (SAS-1.1): Revision 1, Table of Contents, (Sep. 18, 2003), 564 pgs.
Office action dated Jul. 11, 2007 for U.S. Appl. No. 10/977,181.
Office Action dated Dec. 20, 2006 for U.S. Appl. No. 10/815,271.
Final Office action dated Jun. 04, 2007 for U.S. Appl. No. 10/815,271.
Notice of Allowance issued in U.S. Appl. No. 10/977,181, dated Dec. 11, 2007, 12 pgs.

* cited by examiner

RECEIVE BUFFER IN A DATA STORAGE SYSTEM

FIELD

This disclosure relates to a receive buffer in a data storage system.

BACKGROUND

A conventional data storage system may include one device capable of bidirectional communication with another device. One device may include a computer node having a host bus adapter (HBA). The other device may be a mass storage device. A variety of intermediate devices such as expanders, bridges, routers, and switches may also be utilized in the data storage system to facilitate coupling and communication between a plurality of HBAs and mass storage devices. The HBA and mass storage device may each function as a transmitting and receiving device in order to exchange data and/or commands with each other using one or more of a variety of communication protocols. A protocol engine having a transmitting and receiving portion may be utilized to facilitate such communication. The receiving portion of the protocol engine may include a receive buffer that accepts data from any variety of transmitting devices and provides such data to memory.

Typically, the communication protocol defines various frame types and associated maximum frame lengths. Most frame types have an associated maximum frame length. However, exceptions exist where the received frame may be unbounded in size with no maximum frame length. A receive buffer having only one buffer of limited size may not be able to efficiently handle such an unbounded amount of data in a frame.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
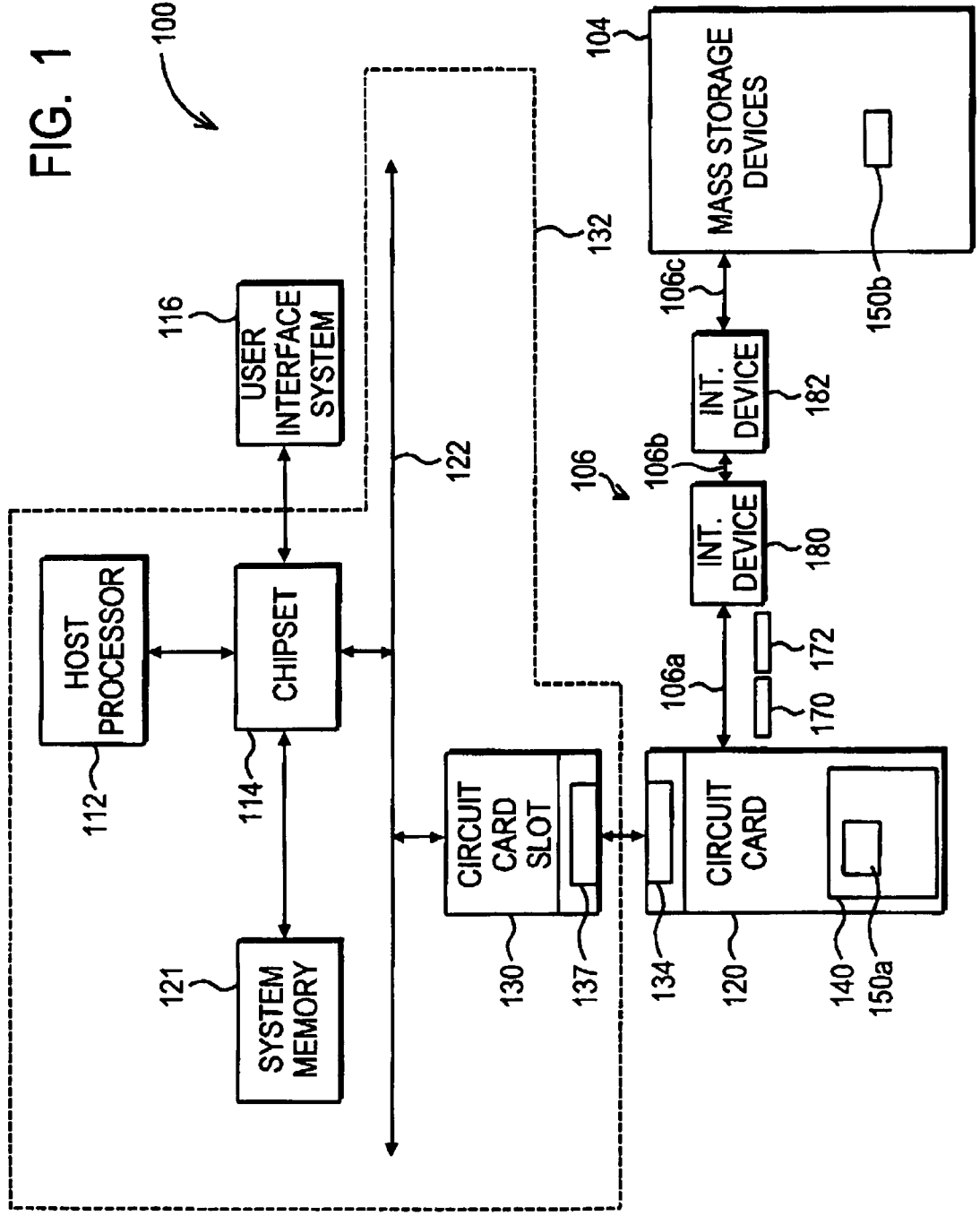
FIG. 1 is a diagram illustrating a system embodiment.

FIG. 1 illustrates a data storage system 100 consistent with an embodiment including a computer node having a host bus adapter (HBA), e.g., circuit card 120. The circuit card 120 is capable of bidirectional communication with mass storage 104 via one or more communication links 106 using one or more communication protocols. The communication links 106 may include any variety and plurality of intermediate devices 180, 182 such as expanders, bridges, routers, and switches and associated links 106a, 106b, 106c coupling the intermediate devices to the circuit card 120 and mass storage 104. Mass storage 104 may include one or more mass storage devices, e.g., one or more redundant array of independent disks (RAID) and/or peripheral devices.

Such communication between the HBA and mass storage 104 may take place by transmission of one or more frames. As used herein in any embodiment, a "frame" may comprise one or more symbols and/or values. Both the HBA 120 and mass storage 104 may act as a receiving device that receives data and/or commands from the other. Each of the HBA 120 and mass storage 104 may have protocol engine circuitry 150a, 150b to facilitate such communication. As used herein, "circuitry" may comprise, for example, singly or in any combination, hardwired circuitry, programmable circuitry, state machine circuitry, and/or firmware that stores instructions executed by programmable circuitry.

The data storage system 100 may also generally include a host processor 112, a bus 122, a user interface system 116, a chipset 114, system memory 121, a circuit card slot 130, and a circuit card 120 capable of communicating with mass storage 104. The host processor 112 may include one or more processors known in the art such as an Intel® Pentium® IV processor commercially available from the Assignee of the subject application. The bus 122 may include various bus types to transfer data and commands. For instance, the bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 122 may alternatively comply with the PCI-X Specification Rev. 1.0a, Jul. 24, 2000, available from the aforesaid PCI Special Interest Group, Portland, Oreg., U.S.A. (hereinafter referred to as a "PCI-X bus").

The user interface system 116 may include one or more devices for a human user to input commands and/or data and/or to monitor the system 100 such as, for example, a keyboard, pointing device, and/or video display. The chipset 114 may include a host bridge/hub system (not shown) that couples the processor 112, system memory 121, and user interface system 116 to each other and to the bus 122. Chipset 114 may include one or more integrated circuit chips, such as those selected from integrated circuit chipsets commercially available from the assignee of the subject application (e.g., graphics memory and I/O controller hub chipsets), although other integrated circuit chips may also, or alternatively be used. The processor 112, system memory 121, chipset 114, bus 122, and circuit card slot 130 may be on one circuit board 132 such as a system motherboard.

The circuit card 120 may be constructed to permit it to be inserted into the circuit card slot 130. When the circuit card 120 is properly inserted into the slot 130, connectors 134 and 137 become electrically and mechanically coupled to each other. When connectors 134 and 137 are so coupled to each other, the card 120 becomes electrically coupled to bus 122 and may exchange data and/or commands with system memory 121, host processor 112, and/or user interface system 116 via bus 122 and chipset 114.

Alternatively, without departing from this embodiment, the operative circuitry of the circuit card 120 may be included in other structures, systems, and/or devices. These other structures, systems, and/or devices may be, for example, in the motherboard 132, and coupled to the bus 122. These other structures, systems, and/or devices may also be, for example, comprised in chipset 114.

The circuit card 120 may communicate with mass storage 104 via one or more communication links 106 using one or more communication protocols. One exemplary communication protocol may include Serial Advanced Technology Attachment (S-ATA). If a S-ATA protocol is used by circuit card 120 to exchange data and/or commands with mass storage 104, it may comply or be compatible with the protocol described in "Serial ATA: High Speed Serialized AT Attachment," Revision 1.0a, published on Jan. 7, 2003 by the Serial ATA Working Group and/or later-published versions.

To accomplish such communication, the circuit card 120 may have protocol engine circuitry 150*a*. The protocol engine circuitry 150*a* may exchange data and commands with mass storage 104 by transmission and reception of one or more frames, e.g., frames 170, 172. A large number of frames from many different devices such as mass storage devices and HBAs may be transmitted via communication links 106. The protocol engine circuitry 150*a* may be included in an integrated circuit (IC) 140. As used herein, an "integrated circuit" or IC means a semiconductor device and/or microelectronic device, such as, for example, a semiconductor integrated circuit chip.

Advantageously, the HBA 120 may include protocol engine circuitry 150*a* to handle receipt of data from received frames, e.g., frames 170, 172. Mass storage 104 may also include similar protocol engine circuitry 150*b*. The protocol engine circuitry 150*a* may be comprised in an associated integrated circuit 140. There may also be intermediate devices 180, 182, including, but not limited to, expanders, bridges, routers, and switches, that may also have circuitry consistent with protocol engine circuitry 150*a*, 150*b*.

Figure 2:
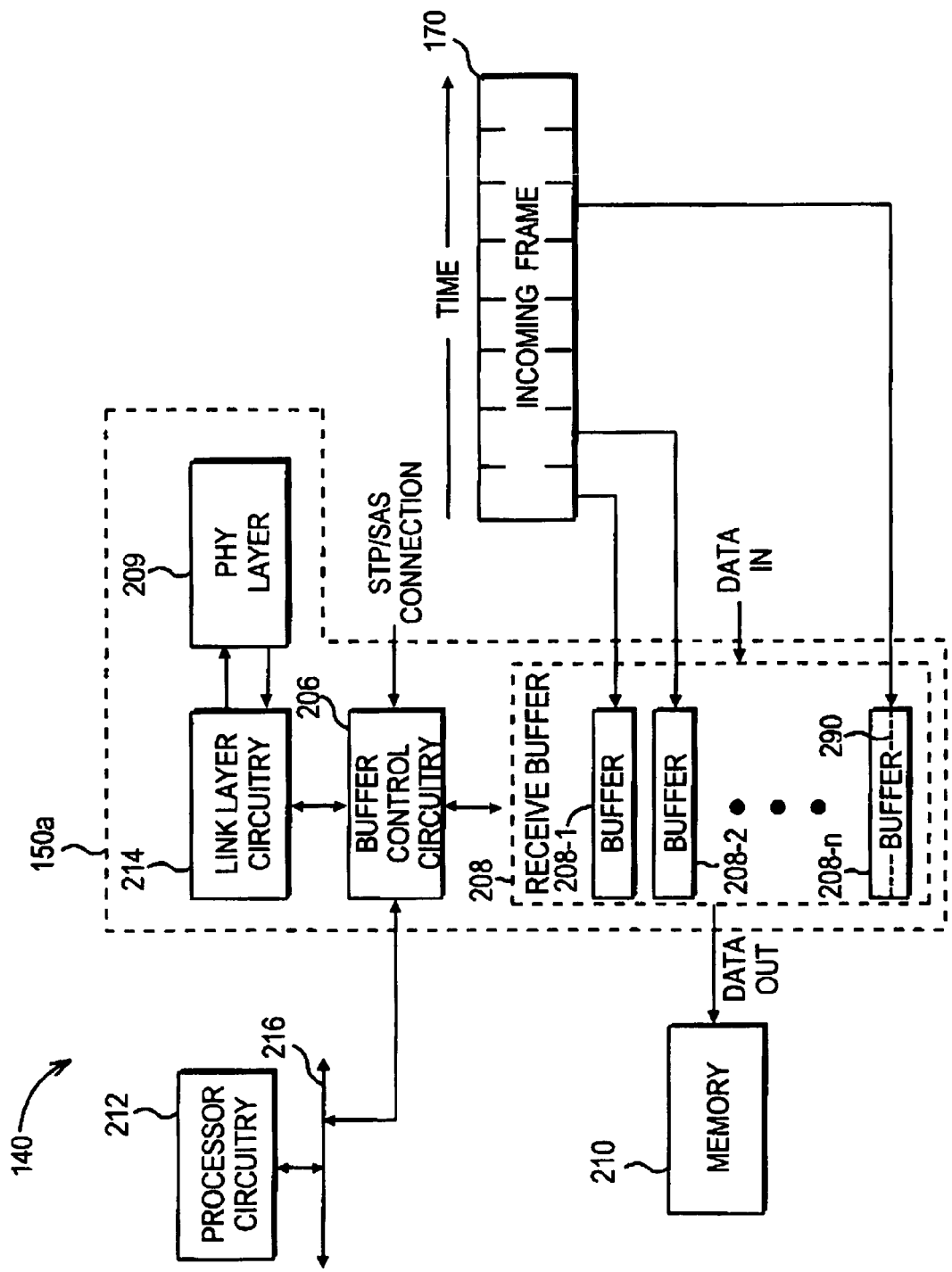
FIG. 2 is a diagram illustrating in greater detail an integrated circuit in the system embodiment of FIG. 1 including a receive buffer consistent with an embodiment.

FIG. 2 illustrates portions of the integrated circuit 140 including protocol engine circuitry 150*a*, processor circuitry 212, processor bus 216, and memory 210. The protocol engine circuitry 150*a* may receive and/or transmit data and/or control signals to and from mass storage 104 via communication links 106. Such data and/or commands may be transmitted and received via frames, e.g., frame 170.

The protocol engine circuitry 150*a* may include a receive buffer 208, buffer control circuitry 206, link layer circuitry 214, and PHY layer circuitry 209. The protocol engine circuitry 150*a* may also include other circuitry such as data transport layer circuitry and port layer circuitry (not illustrated) to further facilitate communication using the appropriate protocol. The receive buffer 208 may be considered a mid-point holding place for data and the buffer control circuitry 206 may control storage of data in, and retrieval of data from, the receive buffer 208. Data output from the receive buffer 208 may be provided to memory 210. The memory 210 may include one or more machine readable storage media such as random-access memory (RAM), dynamic RAM (DRAM), static RAM (SRAM) magnetic disk (e.g. floppy disk and hard drive) memory, optical disk (e.g. CD-ROM) memory, and/or any other device that can store information. The PHY layer circuitry 209 may comprise a physical PHY containing transceiver circuitry to interface to the applicable communication link. The PHY circuitry 209 may alternately and/or additionally comprise a virtual PHY to interface to another virtual PHY or to a physical PHY.

Processor circuitry 212 may include processor core circuitry that may comprise a plurality of processor cores. As used herein, a "processor core" may comprise hardwired circuitry, programmable circuitry, and/or state machine circuitry. Machine readable program instructions may be stored in any variety of machine readable media, e.g., the processor core may have a set of micro-code program instructions that may be executed by the processor circuitry 212, such that when such instructions are executed by the processor circuitry 212 it results in the processor circuitry 212 performing operations described herein. In addition, such program instructions, e.g., machine-readable firmware program instructions, may be stored in other memory locals that may be accessed and executed by the integrated circuit 140 to perform operations described herein.

Processor bus 216 may allow exchange of data and/or commands between at least the processor circuitry 212 and the buffer control circuitry 206. Additional components (not illustrated) may also be coupled to the processor bus 216. The integrated circuit 140 may also include additional components (not illustrated) such as bridge circuitry to bridge the processor bus 216 with an I/O bus. Host interface circuitry (not illustrated) may couple the I/O bus with the bus 122 of the system of FIG. 1 when the circuit card 120 is coupled to the circuit card slot 130.

Figure 3:
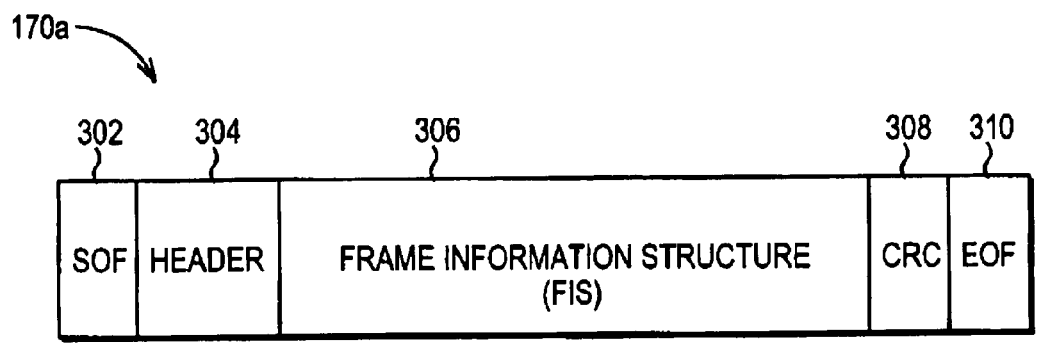
FIG. 3 is a diagram illustrating a frame that may be received by the receive buffer of FIG. 2.

Data incoming from frames, e.g., frame 170, via communication links 106 may be input to the receive buffer 208. The frame may be of a variety of formats depending, at least in part, on the communication protocol utilized. An exemplary S-ATA compliant frame 170*a* is illustrated in FIG. 3. The S-ATA compliant frame may include a start of frame (SOF) primitive 302 to indicate the start of the frame 170*a*. A "primitive" as used herein may be defined as a group of one or more symbols, for example, representing control data to facilitate control of the transfer of information and/or to provide real time status information. A frame header 304 may follow the SOF primitive 304. The frame header 304 may include, among other things, information indicating the frame information structure (FIS) type 306. Following the frame header portion 304 may be the FIS 306. As used herein, the "FIS" may be defined as a portion of the frame that comprises payload. The length of the FIS 306 may be based on the specified FIS type. An error checking code may follow the FIS 306. An error checking code may include a cyclic redundancy check (CRC) 308 to facilitate checking of the validity of the received data in the FIS 306. Finally, an end of frame (EOF) primitive 310 may follow the CRC 308 to mark the end of the frame 170*a*.

The data input to the buffer 208 may include the entire frame, e.g., frame 170*a*. Most frame types have a maximum length. For example, a S-ATA compliant frame typically has a maximum frame payload size of about 8 kilobytes (KB). However, exceptions may exist where the size of an incoming frame is unbounded. For example, if a transmitting device utilizing a Parallel Advanced Technology Attachment (Parallel ATA) communication protocol communicates with a S-ATA device via a Parallel ATA to S-ATA bridge to convert data from Parallel ATA to S-ATA, the Parallel ATA to S-ATA bridge may not breakup un unbounded FIS into a smaller sizes. In this instance, the FIS 306 of the S-ATA compliant frame 170*a* may be unbounded in size resulting in a frame 170*a* size much larger than 8 KB.

To efficiently handle any frame size including unbounded frames, the receive buffer 208 may include a plurality of buffers 208-1, 208-2 ... 208-*n*. Each of the plurality of buffers 208-1, 208-2 ... 208-*n* of the receive buffer 208 may be effectively linked by the buffer control circuitry 206. Each of the plurality of buffers 208-1, 208-2 ... 208-*n* may be of various sizes ranging from, but not limited to, 1 kilobyte (KB), 2 KB, and 8 KB. In one embodiment the plurality of buffers 208-1, 208-2 ... 208-*n* may each be 1 KB. As a frame is received, the first buffer 208-1 may accept a first portion of data until the first buffer 208-1 reaches a data full condition. The buffer control circuitry 206 may sense this data full condition and direct additional data from the frame to be directed to the second buffer 208-2, and so on filling as many successive buffers as necessary to accommodate the frame.

The buffer control circuitry 206 may continue to direct data to the next available buffer in the daisy chain of buffers 208-1, 208-2 . . . 208-n until the receive buffer 208 reaches a high threshold level, e.g., high threshold level 290. If the high threshold level is not reached, the buffer control circuitry 206 may instruct the link layer circuitry 214 to send a reception in progress type primitive to allow receipt of additional data, e.g., in S-ATA this may be a "Reception in Progress" (R_IP) primitive.

However, the data in the receive buffer 208 may reach the high threshold level. This may be caused by lack of available data space in memory 210 to accept data from the receive buffer 208 and/or lack of remaining capacity in the plurality of buffers 208-1, 208-2 . . . 208-n. Once the data level in the receive buffer 208 reaches the high threshold level, the buffer control circuitry 206 may inform the link layer circuitry 214 to send a hold type command to inform the remote node transmitting data to hold transmission of additional data. In S-ATA, such hold type command may be the HOLD primitive. Depending on the size of the buffers 208-1, 208-2 . . . 208-n and the setting of the high threshold level, the last buffer 208-n may be able to hold a certain amount of data before the high threshold level, e.g., high threshold level 290, is reached. The remote node transmitting data may be any variety of devices capable of transmitting data such as the intermediate devices 180, 182, mass storage 104, and/or the HBA 120.

The hold type command takes time to reach the remote transmitting node based, at least in part, on the transmission rate and the location of the transmitting node. In addition, there may be an additional delay from the time the remote transmitting node receives the hold command until the node responds to the hold command by sending an acknowledgement command which terminates transmission of additional data. For example, in S-ATA such acknowledgement command may be the "hold acknowledge" primitive (HOLDA). Such HOLDA primitive may be sent by the transmitting node as long as the HOLD primitive is received from the receiving node. Therefore, the high threshold level should be set at a level to allow accumulation of a predetermined amount of additional data during an elapsed time interval from when the receiving node issued its hold command, e.g., HOLD primitive, until reception by the receiving node of the acknowledgement command from the transmitting node, e.g., HOLDA primitive.

Figure 4:
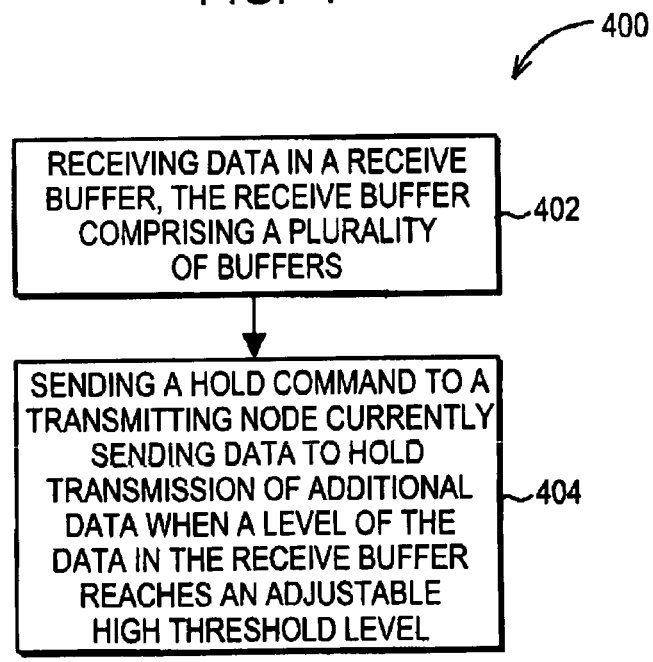
FIG. 4 is a flow chart illustrating operations according to an embodiment.

FIG. 4 is a flow chart of exemplary operation 400 consistent with an embodiment. Operation 402 includes receiving data in a receive buffer. The receive buffer comprises a plurality of buffers. For example, receive buffer 208 comprises a plurality of buffers 208-1, 208-2, . . . 208-n. Operation 404 may include sending a hold command to a transmitting node currently sending data to hold transmission of additional data when a level of the data in the receive buffer reaches a high threshold level.

It will be appreciated that the functionality described for all the embodiments described herein may be implemented using hardware, firmware, software, or a combination thereof.

Thus, in summary, one embodiment may comprise an apparatus. The apparatus may comprise circuitry capable of receiving data in a receive buffer, the receive buffer comprising a plurality of buffers, and sending a hold command to a transmitting node currently sending data to hold transmission of additional data when a level of the data in the receive buffer reaches a high threshold level.

Another embodiment may comprise an article. The article may comprise a receive buffer comprising a plurality of buffers, and buffer control circuitry capable of directing data flow into the plurality of buffers. The buffer control circuitry may be further capable of providing a signal in response to data in all of the plurality of buffers reaching a high threshold level.

A system embodiment may comprise a circuit card comprising an integrated circuit. The circuit card capable of being coupled to a bus. The integrated circuit comprising a receive buffer comprising a plurality of buffers, and the integrated circuit further comprising buffer control circuitry capable of directing data flow into the plurality of buffers. The buffer control circuitry further capable of providing a signal in response to data in all of the plurality of buffers reaching a high threshold level.

Yet another embodiment may comprise an article. The article may comprise a storage medium having stored thereon instructions that when executed by a machine result in the following: creating a plurality of predetermined storage locations in a receive buffer; directing storage of data in the plurality of predetermined storage locations; and sending a hold command to a transmitting node currently sending data to hold transmission of additional data when a level of the in the predetermined storage locations reaches a high threshold level. For example, software may parse one receive buffer 208 into a plurality of predetermined storage locations and direct storage of data in those locations. The predetermined storage locations may include distinct portions of one larger receive buffer or individual buffer such as buffers 208-1, 208-2 . . . 208-n. An exemplary machine to execute instructions may, in one embodiment, be processor circuitry 212.

Advantageously, in these embodiments, the receive buffer 208 enables a receiving device to receive any frame size including an unbounded frame and/or a FIS having a frame payload size of about 8 KB. The receive buffer may include a plurality of buffers 208-1, 208-2 . . . 208-n. For example, such an unbounded frame size may be provided from a parallel ATA to S-ATA bridge since the bridge was not required to breakup the unbounded frame size. These embodiments also enable better utilization of memory 210 and an associated reduction in the size of memory 210. Hence, similar performance may be achieved with less memory 210. This translates to cost savings in addition to saving of space in an environment on the integrated circuit 140 where there is a premium on such space.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method comprising:
receiving an unbounded data frame from a parallel advanced technology attachment (ATA) to serial ATA bridge;
storing said unbounded data frame in a receive buffer, said receive buffer comprising a plurality of buffers;
controlling data flow into said receive buffer by filling successive ones of said plurality of buffers;
establishing a threshold level in one of said buffers; and
sending a hold command to said parallel ATA to serial ATA bridge to hold transmission of additional data when a level of said data in said receive buffer reaches said threshold level.

2. The method of claim 1, wherein each of said plurality of buffers has a capacity of about 1 kilobyte.

3. The method of claim 1, wherein said threshold level is reached when a predetermined portion of the available capacity of all said plurality of buffers is utilized.

4. An apparatus comprising:
   circuitry capable of receiving an unbounded data frame from a parallel advanced technology attachment (ATA) to serial ATA bridge, storing said unbounded data frame in a receive buffer, said receive buffer comprising a plurality of buffers; controlling data flow into said receive buffer by filling successive ones of said plurality of buffers; establishing a threshold level in one of said buffers; and sending a hold command to said parallel ATA to serial ATA bridge to hold transmission of additional data when a level of said data in said receive buffer reaches said threshold level.

5. The apparatus of claim 4, wherein each of said plurality of buffers has a capacity of about 1 kilobyte.

6. The apparatus of claim 4, wherein said threshold level is reached when a predetermined portion of the available capacity of all said plurality of buffers is utilized.

7. A system comprising:
   a parallel advanced technology attachment (ATA) to serial ATA bridge; and
   a circuit card comprising an integrated circuit, said circuit card capable of being coupled to a bus, said integrated circuit comprising a receive buffer comprising a plurality of buffers, and said integrated circuit further comprising buffer control circuitry capable of receiving an unbounded data frame from said parallel advanced technology attachment (ATA) to serial ATA bridge, storing said unbounded date frame in said receive buffer, controlling data flow into said receive buffer by filling successive ones of said plurality of buffers, establishing a threshold level in one of said buffers, and sending a signal to hold transmission of additional data when a level of said data in said receive buffer reaches said threshold level.

8. The system of claim 7, wherein said integrated circuit further comprises:
   link layer circuitry responsive to said signal to provide a hold command to a transmitting node currently sending data to hold transmission of additional data.

9. The system of claim 7, wherein each of said plurality of buffers has a capacity of about 1 kilobyte.

10. An article, comprising:
    a storage medium having stored thereon instructions that when executed by a machine result in the following:
       creating a plurality of predetermined storage locations in a receive buffer;
       directing storage of an unbounded data frame from a parallel advanced technology attachment (ATA) to serial ATA bridge in said plurality of predetermined storage location by controlling data flow into said receive buffer by filling successive ones of said plurality of predetermined storage locations; and
       sending a hold command to said parallel ATA to serial ATA bridge to hold transmission of additional data when a level of said in said predetermined storage locations reaches a threshold level.

11. The article of claim 10, wherein each of said plurality of predetermined storage locations comprises a buffer.

12. The article of claim 11, wherein each said buffer has a capacity of about 1 kilobyte.

* * * * *